United States Patent [19]
Coulson

[11] 3,760,016
[45] Sept. 18, 1973

[54] EXO-3-METHYLTRICYCLO(4.2.1.0$_{2,5}$)-NONA-3,7-DIENES AND THEIR PREPARATION FROM ALLENE AND A BICYCLO (2.2.1)HEPTA-2,5-DIENE

[75] Inventor: Dale Robert Coulson, Wilmington, Del.

[73] Assignee: E. I. du Pont de Nemours and Company, Wilmington, Del.

[22] Filed: Mar. 23, 1971

[21] Appl. No.: 127,398

[52] U.S. Cl............. 260/666 PY, 260/611, 260/668
[51] Int. Cl............................................... C07c 3/00
[58] Field of Search...................... 260/666 PY, 611, 260/668

[56] References Cited
UNITED STATES PATENTS

| | | | |
|---|---|---|---|
| 3,265,749 | 8/1966 | Cannell | 260/666 PY |
| 3,258,501 | 6/1966 | Cannell | 260/666 PY |
| 2,960,541 | 11/1960 | Elam et al. | 260/666 PY |

Primary Examiner—Delbert E. Gantz
Assistant Examiner—Veronica O'Keefe
Attorney—James H. Ryan

[57] ABSTRACT

Novel polymer-forming exo-3-methyltricyclo[4.2.1.0$^{2,5}$]-nona-3,7-dienes are prepared from allene and bicyclo[2.2.1]-hepta-2,5-dienes in the presence of palladium(o) or nickel(o) compounds used as catalysts.

3 Claims, No Drawings

EXO-3-METHYLTRICYCLO(4.2.1.0²,⁵)NONA-3,7-DIENES AND THEIR PREPARATION FROM ALLENE AND A BICYCLO (2.2.1)HEPTA-2,5-DIENE

BACKGROUND OF THE INVENTION

1. Field of the Invention

This invention relates to novel compositions of matter, exo-3-methyltricyclo[4.2.1.0²,⁵]nona-3,7-dienes and homopolymers and copolymers thereof, and their preparation from allene and a bicyclo[2.2.1]hepta-2,5-diene.

2. Prior Art

1. Cannell, U.S. Pat. 3,258,501, shows the formation of exo-tricyclo[4.2.1.0²,⁵]nona-3,7-diene by pyrolysis of bicycloheptadiene dimer and of exo-3-ethyltricyclo[4.2.1.0²,⁵]-nona-3,7-diene by the addition of norbornadiene 1-butyne to nonbornadiene in the presence of Ni(O) catalysts. See also L. G. Cannell, Tet. Letters, 5967 (1966).

2. Applequist, et al., U.S. Pat. No. 2,940,984, show tricyclo[4.2.1.0²,⁵]non-7-enes:

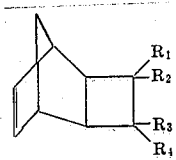

3. Schrauzer, et al., 97, 2451 (1964), describe the preparation of 7,8-diphenyltricyclo[4.2.1.0²,⁵]nona-3,7-diene from norbornadiene and diphenylacetylene.

4. Watts, et al., J. Am. Chem. Soc., 88,623 (1966), describe the preparation of endo-tricyclo[4.2.1.0²,⁵]nona-3,7-diene from cyclopentadiene and cyclobutadiene.

5. Natta, et al., U.S. Pat. No. 3,383,371, show copolymers of a monoalkenylcyclobutene and at least one mono-olefin selected from ethylene, propylene and 1-butene (examples include 3-(1-methylallyl)cyclobutene and 3-(5-hexenyl)cyclobutene.

6. Adamek, et al., U.S. Pat. No. 3,211,709, show copolymers containing at least two α-olefins of two to 10 carbons and an ethylenically unsaturated bridged ring hydrocarbon containing at least two ethylenic double bonds.

SUMMARY AND DETAILS OF THE INVENTION

The present novel compounds have the generic formula I,

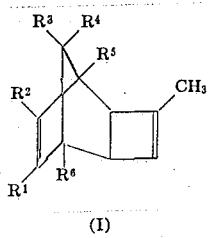

where $R^1$ and $R^2$ can be alike or different, and can be hydrogen or lower alkyl (of up to four carbons) and where $R^3$, $R^4$, $R^5$ and $R^6$ can be alike or different and can be hydrogen, lower alkyl or lower alkoxy (of up to four carbons) or aryl of up to eight carbon atoms.

The compounds of formula (I) can be prepared according to the following equation:

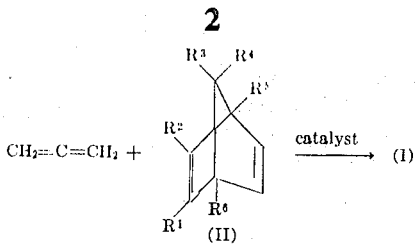

wherein $R^1$, $R^2$, $R^3$, $R^4$, $R^5$ and $R^6$ are defined as above for (I).

In practice, the reactants are merely contacted with each other and a catalytic amount of a palladium(O) or nickel(O) complex catalyst, generally in the liquid phase, and the reaction allowed to proceed. The mole ratio of diene/-allene can range from 10:1 to 1:10, the preferred ratio being 5:1.

The reaction temperature ranges from 75°C to 175°C, with a range of 120°–150°C preferred. Sufficient pressure is required to keep both reactants in the liquid phase for best results. Since allene is a low-boiling liquid (bp=–34.5°C) and is quite soluble in norbornadienes, pressures from 200–600 psig are adequate.

The reaction can be run in any suitable organic solvent which is inert toward reactants and products and fluid under reaction temperature conditions. The preferred solvents include: hydrocarbons such as benzene, xylene, toluene and hexane; and nitriles, such as acetonitrile, propionitrile, and benzonitrile. Halogenated solvents such as chloroform or strongly coordinating solvents such as dimethylsulfoxide, phosphites, phosphines or amines appear to be poor solvents.

Any complex compound of palladium(O) or nickel(O) is regarded as useful as a catalyst in the process of this invention, the palladium catalyst being preferred. Mixtures of catalysts can, of course, be employed, but without particular benefit. The quantity of catalyst is not critical and can vary widely, e.g., a catalyst: allene mole ratio in the range of about 1:40–1:600 being generally employed with about 1:100 being preferred. The amount used will be referred to as "a catalytic amount" herein. A list of usable catalysts is given in Table I.

TABLE I

Equivalent Pd(O) and Ni(O) Catalysts
Tetrakis(triphenylphosphine)palladium(O)
Bis(triphenylphosphine)(maleic anhydride)-palladium(O)
Bis(triphenylphosphine)(dimethyl fumarate)-palladium(O)
Bis(triphenylphosphine)(dimethyl maleate)-palladium(O)
Bis[1,2-bis(dimethylphosphino)ethane]-palladium(O)
Bis[o-bis(diethylphosphino)benzene]-palladium(O)
Bis[bis(diphenylphosphino)methane]-palladium(O)
Bis[bis(1,2-diphenylphosphino)ethane]-palladium(O)
Bis[bis(o-dimethylarsino)benzene]-palladium(O)
Bis(triphenylphosphine)(fumaronitrile)-palladium(O)
Bis(triphenylphosphine)(maleic anhydride)-palladium(O)
Triphenylphosphine(tricarbonyl)nickel(O)
Triphenylarsine(tricarbonyl)nickel(O)

Bis(triphenylphosphite)(dicarbonyl)nickel(O)
o-Phenylenebis(diethylphosphine)(dicarbonyl)nickel(O)
Tris(triphenylphosphite)(carbonyl)nickel(O)
Tetrakis(triphenylphosphite)nickel(O)
Bis(cyclooctadiene)nickel(O)
Tetrakis(triphenylphosphine)nickel(O)

EMBODIMENTS OF THE INVENTION

There follow some nonlimiting examples illustrating all aspects of the invention. In these examples, parts and percentages are by weight unless otherwise noted.

EXAMPLE 1

Part A

This procedure is a slightly modified version of the procedure of S. Takahashi and N. Hagehara, Nippon K-agaku Zasshi, 88, 1306 (1967): A solution of 51.1 g (44.2 mmoles) of tetrakis(triphenylphosphine)palladium(O) was prepared in 1000 ml of benzene under nitrogen. To this was added a solution of 4.92 g (50 mmoles) of maleic anhydride in 90 ml of benzene over 2 minutes with stirring. Benzene was evaporated from the resulting solution on a rotary evaporator and the residue extracted with 400 ml of ether. The insoluble portion was then again washed with 3 times 20 ml portions with acetone. The residue was allowed to dry giving 24.6 g of bis(triphenylphosphine)-(maleic anhydride)palladium(O).

Part B

A solution of 3.5 g (4.5 mmoles) of bis(triphenylphosphine)(maleic anhydride)palladium(O) in 264 ml (2700 mmoles) of norbornadiene was placed in a 400-cc stainless steel-lined autoclave. The system was then charged with 23 g (563 mmoles) of allene. The autoclave was heated to 145°C for 5 hours with shaking. The resulting solution was distilled under aspirator pressure (~20 mm) to give a crude fraction. This fraction was redistilled on an 18 inch spinning-band column to afford 12.8 g (17.2 percent yield, based on allene) of exo-3-methyltricyclo[4.2.1.0$^{2,5}$]nona-3,7-diene, bp 49°–51.2°C/16 mm.

Anal. Calcd. for $C_{10}H_{12}$: C, 90.8; H, 9.20; Found: C, 90.7; H, 9.26.

IR (neat): 1630, 1590 and 1561 cm$^{-1}$.

NMR (220 MHz, $CCl_4$): 1.31δ ppm (H$^c$, H$^d$, AB, $J_{c,d}$ = 9Hz); 1.67δ (s, H$^j$); 2.15δ (broad s, H$^g$ or H$^h$); 2.18δ (broad s, H$^g$ or H$^h$); 2.32δ (m, H$_e$, H$^f$); 5.85δ (s, H$^i$); 6.00δ (broad s, H$^a$, H$^b$).

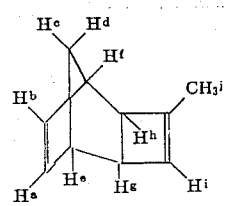

Part C

As further proof of the structure of exo-3-methyltricyclo[4.2.1.0$^{2,5}$]nona-3,7-diene, a catalytic hydrogenation was carried out. A sample of the diene (0.661 g, 5 mmoles) was mixed with 0.05 8 of 5 percent palladium on carbon and 5 ml of ethanol. The resulting mixture absorbed 252.2 cc of hydrogen indicating the saturation of 2.04 double bonds. Gas-liquid chromatographic analysis on 20% silicone gum nitrile (4 feet × ¼ inches) at 78°C revealed one major product (retention time = 17 minutes. Collection of this material afforded a very pure sample of exo-3-methyltricyclo[4.2.1.0$^{2,5}$]nonane.

Anal. Calcd. for $C_{10}H_{16}$: C, 88.25; H, 11.85; Found: C, 88.76; H, 12.23.

EXAMPLE 2

Solutions of the reactants norbornadiene and allene at varying mole ratios in benzene containing bis(triphenylphosphine)(maleic anhydride)palladium(O) (0.728 g, 1 mmole) were heated to 145°C for 6 hours in an 80-cc stainless steel-lined autoclave. The resulting solutions were diluted to 100 cc with benzene and analyzed by gas-liquid chromatography. Comparison with a standard solution gave the yields of exo-3-methyltricyclo[4.2.1.0$^{2,5}$]nona-3,7-diene based on the reactant not present in excess. The details are summarized in Table II.

TABLE II

Effect of Mole Ratio of Allene: Norbornadiene on Production of exo-3-Methyltricyclo[4.2.1.0$^{2,5}$]nona-3,7-diene

| Example | Mmoles of Norboradiene | Mmoles of Allene | Solvent (ml) | % Yield |
|---|---|---|---|---|
| 2-A | 500 | 50 | 2 | 44.2 |
| 2-B | 500 | 100 | none | 53.2 |
| 2-C | 100 | 100 | 40 | 13.4 |
| 2-D | 100 | 500 | 17 | 19.2 |

EXAMPLE 3

A series of metal complexes were tested for activity in the formation of exo-3-methyltricyclo[4.2.1.0$^{2,5}$]-nona-3,7-diene from allene and norbornadiene.

In each case, a solution of 51 ml (500 mmoles) of norbornadiene in benzene, 4 g (100 mmoles) of allene and 1 mmole of metal complex was heated to 145°C for 6 hours in an 80-cc "Hastelloy" C-lined autoclave. The product was analyzed after dilution to 100 ml with benzene by gas-liquid chromatography and the results were compared with a standard solution of exo-3-methyltricyclo[4.2.1.0$^{2,5}$]nona-3,7-diene. Yields are summarized in Table III.

TABLE III

Activity of Various Metal Complexes in Production of exo-3-Methyltricyclo[4.2.1.0$^{2,5}$]nona-3,7-diene

| Example | Complex | % Yield |
|---|---|---|
| 3-A | Tris(triphenylphosphine)chlororhodium | None |
| 3-B | Bis(triphenylphosphine)chloro-(carbonyl)iridium | None |
| 3-C | Tetrakis(triphenylphosphine)palladium | 5.8 |
| 3-D | Bis(triphenylphosphine)dichloropalladium | 0.4 |
| 3-E | Bis(triphenylphosphine)(dicarbonyl)nickel | 1.1 |
| 3-F | Bis(triphenylphosphine)(chloro-(phenyl)palladium | 0.1 |
| 3-G | Tetrakis(triphenylphosphine)platinum | None |
| 3-H | Octacarbonyldicobalt | None |
| 3-I | Bis(benzonitrile)dichloropalladium | None |

EXAMPLE 4

The effect of various solvents on the production of exo-3-methyltricyclo[4.2.1.0$^{2,5}$]nona-3,7-diene from allene and norbornadiene was determined in the following way:

A solution of norbornadiene (25 ml, 250 mmoles), allene (2 g, 50 mmoles), and bis(triphenylphosphine)(maleic anhydride)palladium (0.365 g, 0.5 mmole) in 35 ml of an appropriate solvent was heated to 145°C for 6 hours in an 80-cc "Hastelloy" C-lined autoclave. The product solution was diluted to 100 ml with benzene and analyzed by gas-liquid chromatography and compared with a standard solution of exo-3-methyltricyclo[4.2.1.0$^{2,5}$]nona-3,7-diene. The results are summarized in Table IV.

TABLE IV

Effect of Solvent on Production of exo-3-Methyltricyclo-[4.2.1.0$^{2,5}$]nona-3,7-diene

| Example | Solvent | % Yield |
|---|---|---|
| 4-A | Benzene | 53.0 |
| 4-B | Acetonitrile | 38.8 |
| 4-C | Methanol | 1.4 |
| 4D | Chloroform | 0.6 |

When substituted norbornadienes are used in place of norbornadiene in the procedure, e.g., of Example 1, the products are as shown in the following Table V:

TABLE V

| Substituents[1] | Name of Starting Diene[2] | Name of Product Diene[1] |
|---|---|---|
| R$^3$=OCH$_2$CH$_3$ | 7-Ethoxy-BHD | Exo-9-Ethoxy-MND |
| R$^1$=CH$_3$ | 2-Methyl-BHD | Exo-7-Methyl-MND and Exo-8-Methyl-MND |
| R$^1$=CH$_2$CH$_3$ | 2-Ethyl-BHD | Exo-7-Ethyl-MND and Exo-8-Ethyl-MND |
| R$^3$=OCH$_3$ | 7-Methoxy-BHD | Exo-9-Methoxy-MND |
| R$^3$=CH(CH$_3$)$_2$ | 7-Isopropyl-BHD | Exo-9-Isopropyl-MND |
| R$^3$=C$_6$H$_5$ | 7-Phenyl-BHD | Exo-9-MHD |
| R$^6$=CH$_3$ | 1-Methyl-BHD | Exo-1-Methyl-MND and Exo-6-Methyl-MND |
| R$^3$=OCH$_2$CH$_2$CH$_3$ | 7-Propoxyy-BHD | Exo-9-propoxy-MND |
| R$^3$=OCH$_2$CH$_2$CH$_2$CH$_3$ | 7-Butoxy-BHD | Exo-9-butoxy-MND |
| R$^1$=CH$_2$CH$_2$CH$_3$ | 2-Propyl-BHD | Exo-7-propyl-MND and Exo-8-propyl-MND |
| R$^1$=CH$_2$CH$_2$CH$_2$CH$_3$ | 2-Butyl-BHD | Exo-7-butyl-MND and Exo-8-butyl-MND |
| R$^3$=p-toluyl | 7-(p-toluyl)-BHD | Exo-9-(p-toluyl)-MND |
| R$^3$=m-anisyl | 7-(m-anisyl)-BHD | Exo-9-(m-anisyl)-MND |
| R$^3$=o-ethylphenyl | 7-(o-ethylphenyl)-BHD | Exo-9-(o-ethylphenyl)-MND [1]All R's = H except for those mentioned. [2]Bicyclo[2.2.1]hepta-2,5-diene = BHD; Exo-3-methyltricyclo-[4.2.1.0$^{2,5}$]nona-3,7-diene = Exo-MND |

The 1- and 2-substituted norbornadienes of Table V can be prepared by the method of Fr. Pat. No. 1,478,766, utilizing the conventional Diels-Alder route:

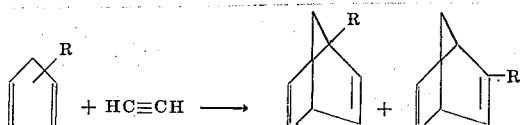

R = alkyl or aryl

The 7-substituted norbornadienes of Table V may be prepared either by the method of P. R. Story and S. R. Fahrenholtz, J. Org. Chem., 28, 1716 (1963), when the substituent is alkyl or aryl, or by the method of G. Wittig and J. Otten, Tet. Letters, 1963, 601, when the substituent is alkoxy or aryloxy. The former method involves the route:

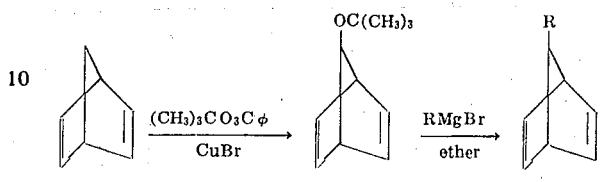

The latter method involves the route:

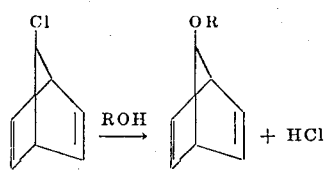

The novel monomers of this invention form useful copolymers, e.g., binary and tertiary (terpolymers), which themselves constitute part of the invention.

The copolymers may be prepared by conventional Ziegler-Natta type copolymerization. This procedure involves solution polymerization of olefinic components by means of a Group IV-B or V-B metal halide-aluminum alkyl catalyst system (H. V. Boenig, Polyolefins: Structure and Properties, Amer. Elsevier, New York, 1966.) Usually titanium halides or alkoxides are employed. For example, a terpolymer of ethylene, propylene and dicyclopentadiene has been prepared (W. R. Sorenson and T. W. Campbell, "Prep. Methods of Polymer Chemistry," Interscience Publishers, p. 299.) with ethyl aluminum sesquichloride and vanadium tetrachloride as catalysts.

Example A which follows illustrates the preparation of a terpolymer of the invention.

EXAMPLE A

Part A

A terpolymer of the monomer of Example 1, ethylene and propylene was prepared by utilization of a conventional 500-cc, continuous-phase, atmospheric reactor. A 0.1-molar solution of vanadium tris(acetylacetonate) in hexane and a 1.0-molar solution of diisobutylaluminum chloride in hexane were fed at a rate of 0.025 cc/minute into the bottom of the reactor. The solvent hexane was fed at 1500 cc/hour. A gaseous mixture of ethylene and propylene in a mole ratio of 1:5 was piped in while simultaneously adding exo-3-methyltricyclo[4.2.1.0$^{2,5}$]nona-3,7-diene of Example 1 at a rate of 0.0275 cc/minute. The reactor was run under the above conditions for 6 hours and yielded 68.37 g of dried polymer, i.e., 96% conversion, having 41% propylene, 6.8% diene and 0.52 mole/kg net unsaturation.

An inherent viscosity measurement at 0.1 percent concentration in Perclene perchlorethylene and at 25°C gave a value of 6.47. A bromine-number determination gave a value, after correction for hydrogen bromide formed, of 0.61.

Part B

The terpolymer prepared above was cured by placing a mixture of 100 parts by weight of polymer, 100 parts of carbon black, 75 parts of paraffinic process oil (ASTM type 104B), 5 parts of zinc oxide, 1.5 parts of tetramethylthiuram monosulfide, 0.75 parts of 2-mercaptobenzothiazole, and 1.25 parts of sulfur on an Oscillating Disk Rheometer at 166°C for approximately 20 minutes. The terpolymer thus treated formed a tough elastomeric film suitable as a wrapping film. The material is also suitable as a rubber substitute, e.g., in shoe soles or automobile tires.

Additional copolymers (binary and ternary) of the invention that can be prepared by the procedure of Example A are given in Table VI.

TABLE VI

Components of Copolymers and Terpolymers Containing
EXxo-3-methyltricyclo[4.2.1.0$^{2,5}$]-nona-3,7-diene

|    | Component 2 | Component 3 |
|----|-------------|-------------|
| 1. | Ethylene    |             |
| 2. | Ethylene    | Propylene   |
| 33.| Styrene     |             |
| 4. | Styrene     | Propylene   |
| 5. | 4-methyl-1-pentene |      |
| 6. | 4-methyl-1-pentene | Ethylene |
| 7. | 1-hexene    |             |
| 8. | 1-hexene    | Propylene   |
| 9. | 4-phenyl-1-butene |       |
| 10.| 4-phenyl-1-butene | Ethylene |
| 11.| Allene      |             |
| 12.| Butadiene   |             |

Since obvious modifications and equivalents will be evident to those skilled in the chemical arts, I propose to be bound solely by the appended claims.

The embodiments of the invention in which an exclusive property or privilege is claimed are defined as follows:

1. The process of preparing a compound of the formula

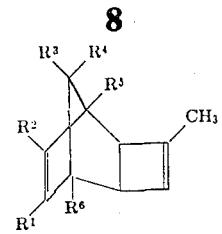

wherein
R$^1$ and R$^2$, alike or different, are hydrogen or lower alkyl, and
R$^3$, R$^4$, R$^5$ and R$^6$, alike or different, are hydrogen, lower alkyl or alkoxy or aryl of up to 8 carbon atoms,
which comprises contacting and reacting allene with a norbornadiene of the formula

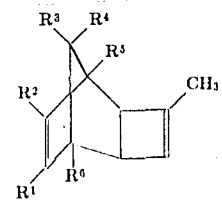

wherein the R's are as defined above
in liquid phase in an inert organic solvent at a temperature of 75°–175°C and a pressure of 200–600 psig with
a catalytic amount of Pd(O) or a Ni(O) compound, the catalyst:allene mole ratio being in the range of about 1:40-1:600 and the diene:allene mole ratio ranging from about 10:1 to 1:10.

2. The process of claim 1 which comprises reacting allene with norbornadiene in liquid phase with a catalytic amount of a Pd(O) or a Ni(O) compound.

3. The process of claim 2 in which the catalyst is bis(triphenylphosphine)(maleic anhydride)palladium(O).

* * * * *